United States Patent [19]
Kaneko

[11] 3,994,005
[45] Nov. 23, 1976

[54] FILM WINDING AND SHUTTER ACTUATING MECHANISM FOR A CARTRIDGE FILM TYPE CAMERA

[75] Inventor: Hirokazu Kaneko, Tokyo, Japan

[73] Assignee: Ricoh Co., Ltd., Tokyo, Japan

[22] Filed: Sept. 29, 1975

[21] Appl. No.: 617,719

[30] Foreign Application Priority Data
Sept. 30, 1974 Japan............................. 49-111739

[52] U.S. Cl. .............................................. 354/206
[51] Int. Cl.$^2$ ...................................... G03B 17/42
[58] Field of Search ............ 354/204, 205, 206, 213

[56] References Cited
UNITED STATES PATENTS

| | | | |
|---|---|---|---|
| 2,688,279 | 9/1954 | Hodges | 354/206 |
| 2,833,189 | 5/1958 | Kaden et al. | 354/204 |
| 3,253,526 | 5/1966 | Steisslinger | 354/206 |
| 3,714,877 | 2/1973 | Schröder | 354/213 |
| 3,730,066 | 5/1973 | Ettischer et al. | 354/204 |
| 3,747,494 | 7/1973 | Peters | 354/213 |
| 3,768,389 | 10/1973 | Ettischer et al. | 354/206 |
| 3,779,145 | 12/1973 | Ettischer et al. | 354/206 |

*Primary Examiner*—Donald A. Griffin
*Attorney, Agent, or Firm*—Edward F. Connors

[57] ABSTRACT

A film winding member and a shutter cocking member are movable as a unit until the shutter is cocked, and then the film winding lever moves by itself. The film winding member is stopped when a film position sensing lever senses a hole in the film indicating the frame position. Means are provided to prevent a shutter release member from being moved until the film has been advanced and the film winding member has been returned to its initial position. The film advancing operation and the shutter cocking operation are accomplished with one stroke of the film winding member.

17 Claims, 3 Drawing Figures

FILM WINDING AND SHUTTER ACTUATING MECHANISM FOR A CARTRIDGE FILM TYPE CAMERA

The present invention relates to a film winding and shutter actuating mechanism especially suited to a cartridge film type camera.

Cameras have recently been introduced and have become popular which use 110 cartridge type film. A film winding lever is generally provided which is reciprocatingly rotated to advance the film. However, since these cameras do not comprise sprockets but advance the film by rotating the cartridge take-up spool, they do not accomplish complete advancement of the film to the next frame in one reciprocation of the winding lever. Generally, the film is advanced by about 60% of one frame by one reciprocation of the winding lever and the winding lever must be reciprocated again to advance the other 40%. Since the winding operation takes twice as long as, for example, a 35mm camera which accomplishes film advance in one reciprocation of the winding lever, high speed sequence photography has heretofore not been practical with such cameras.

Another problem is that since the film take-up spool is rotated rather than a sprocket, the angular amount the take-up spool must be rotated to advance one frame of the film decreases as more film is wound on the take-up spool and the effective diameter of the take-up spool increases.

Another drawback of such cameras is that since the shutter is easily released, it is advantageous to provide means to prevent releasing of the shutter while the film is being advanced so as to ensure that film will not be wasted. Such cameras are not, generally, provided with such means.

It is therefore an object of the present invention to provide a film winding and shutter actuating mechanism for a cartridge film type camera which accomplishes accurate advancement of the film and cocking of the shutter with one stroke of a film winding member.

It is another object of the present invention to provide a film winding and shutter actuating mechanism for a camera which prevents the shutter from being released except when the film has been advanced and the film winding member has been returned to its initial position.

It is another object of the present invention to provide a camera film winding and shutter actuating mechanism which includes a film take-up spool drive member, a shutter cocking member movable with the spool drive member, cocking member stop means operatively arranged to prevent movement of the cocking member beyond a shutter cocking position, cocking member biasing means releasably connecting the cocking member to the spool drive member so that the cocking member is movable in a film winding direction with the spool drive member to the shutter cocking position and the spool drive member is movable further against the force of the cocking member biasing means, film position sensing means operative to sense when the film has been moved into a frame position and move from a sensing position to a film frame position in response thereto, and spool drive member stop means actuated by the position sensing means and operative to stop movement of the spool drive member when the position sensing means senses that the film has been moved to the frame position and moves to the film frame position.

The above and other objects, features and advantages of the present invention will become clear from the following detailed description taken with the accompanying drawings, in which.

Figure 1:
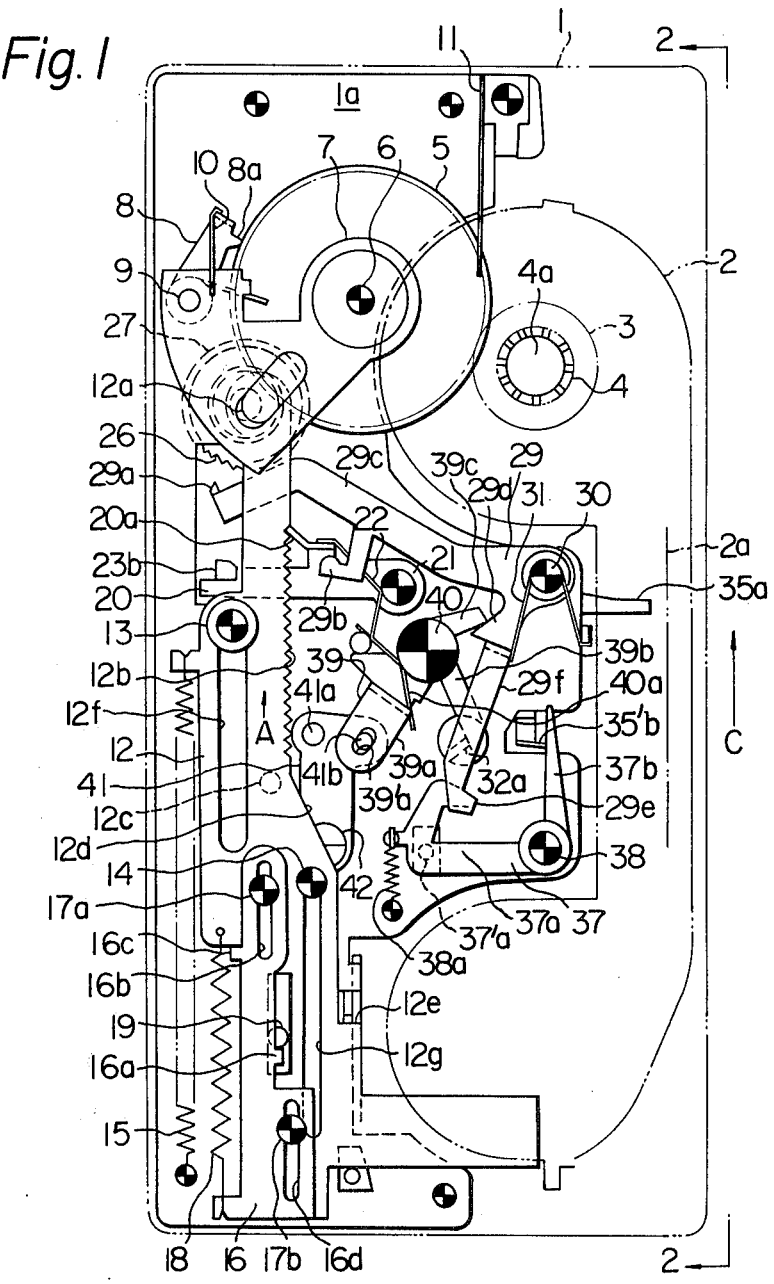
FIG. 1 is a front plan view of a camera film winding and shutter actuating mechanism according to the present invention.

Referring first to FIG. 1, the mechanism comprises a main frame 1 for supporting the mechanism and the additional components of a camera (not shown) having a mounting plate 1a. The frame 1 is designed to fixedly but detachably hold a 110 type film cartridge 2, which has a take-up film spool 3 which is inserted for rotation with a film take-up spool drive shaft 4a integral with a take-up spool gear 4. A winding gear 5 is rotatable about a pin 6 and meshes with the take-up spool gear 4. A rocker arm 7 is also rotatable about the pin 6 and has a pin 9 fixed thereto about which is rotatable a pawl arm 8. A spring 10 biases the pawl arm 8 clockwise in FIG. 1 so that a pawl 8a of the pawl arm 8 is biased into engagement with the teeth of the winding gear 5. It will be seen that the winding gear 5 also serves as a ratchet wheel. A resilient pawl 11 mounted on the mounting plate 1a prevents the winding gear 5 from rotating counterclockwise.

A take-up spool drive member in the form of a drive bar 12 is guided for vertical movement as viewed in FIG. 1 by means of longitudinal slots 12f and 12g formed therethrough through which extend pins 13 and 14 respectively which are fixed to the mounting plate 1a. Although not shown, the camera comprises a film winding lever which is rotatably reciprocatable by the photographer and is mounted on the top of the camera. This film winding lever is connected to move the drive bar 12 so that rotary reciprocating movement of the film winding lever causes vertical reciprocating movement of the drive bar 12. The rocker arm 7 is formed with a slot 7a through which extends a pin 12a fixed to the drive bar 12, so that upward movement of the drive bar 12, as viewed in FIG. 1, causes clockwise rotation of the rocker arm 7 and winding gear 5. A pin 12c is also fixed to the drive bar 12, and the drive bar 12 is formed with a slanted edge 12d and a step 12e which extends rightward from the drive bar 12.

A tension spring 15 biases the drive bar 12 downwards as viewed in FIG. 1. Pins 17a and 17b are fixed to the drive bar 12 which extend through longitudinal slots 16b and 16d respectively formed through a shutter cocking bar 16 to guide the shutter cocking bar 16 vertically with respect to the drive bar 12. In the condition shown in FIG. 1, a tension spring 18 connected between the drive bar 12 and cocking bar 16 urges the cocking bar 16 upward so that a lug 16c of the cocking bar 16 abuts against a lower edge portion (no numeral) of the drive bar 12. Another lug 16a of the cocking bar 16 engages with a shutter cocking pin 19 of a camera shutter (not shown) so that upward movement of the cocking pin 19 from the initial position shown to a cocking position cocks the shutter.

Figure 3:
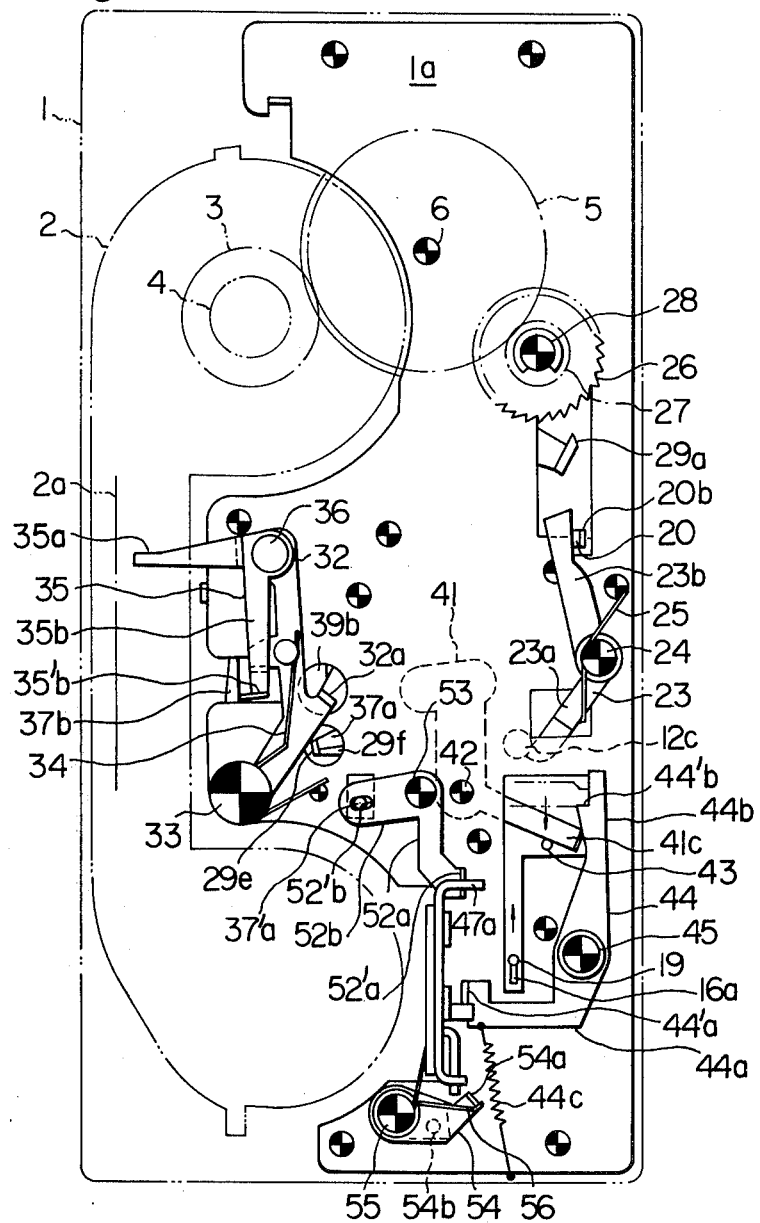
FIG. 3 is a rear plan view of the mechanism.

The drive bar 12 is formed with a serrated edge portion 12b. A unidirectional pawl arm 20 is pivotal about a pin 21 and biased counterclockwise as viewed in FIG. 1 by a spring 22 so that a pawl 20a of the pawl arm 20 engages with the serrated edge 12b of the drive bar 12. Referring also to FIG. 3, a latching lever 23 is rotatable about a pin 24 and is biased clockwise as viewed in FIG. 3 by a spring 25. The latching lever 23 has a lower arm 23a engageable with the pin 12c and an upper arm 23b engageable with the unidirectional pawl arm 20. A ratchet wheel 26 integral with a gear 27 which meshes with the winding gear 5 is rotatable about a pin 28. A pawl lever 29 is rotatable about a pin 30 and has a pawl 29a formed thereon which is engageable with the ratchet wheel 26. The pawl 29a is formed on an arm 29c of the pawl lever 29 which is formed with an L-shaped extension 29b engageable with the pawl 20a of the pawl arm 20. A lower arm 29f of the lever 29 if formed with a lug 29e at its end and a slanted extension edge 29d near the pin 30. The pawl arm 29 is biased clockwise as viewed in FIG. 1 by a spring 31.

The film in the cartridge 2 is designated as 2a and is formed with frame holes or perforations which are not shown but are provided one for each frame of film. Film position sensing means for sensing when the film 2a is in a frame position or in a framing condition comprises a first lever 32 which is pivotal about a pin 33. The first lever 32 is biased counterclockwise as viewed in FIG. 3 by a spring 34. The first lever 32 is formed with a lug 32a. A film perforation sensing lever 35 is pivotally connected to the first lever 32 by a pin 36 and has an arm 35a, the end of which is adapted to extend into the perforations in the film 2a when aligned therewith and an arm 35b which has a lug 35b' formed at its end.

A latch lever 37 is pivotal about a pin 38 and is biased counterclockwise as viewed in FIG. 1 by a spring 38a. The latch lever 37 has a lower arm 37a, the end of which is doubled back and adapted to engage with the lug 29e of the pawl lever 29 to hold the pawl lever 29 in a latched position disengaged form the ratchet wheel 26. The latch lever 37 further has an upper arm 37b which is engageable with the lug 35b' of the sensing lever 35.

The pawl lever 29, constitutes part of a stop means for the take-up spool 3, is provided with reset means which comprises a spring loaded reset lever 39 pivotal about a pin 40 and biased clockwise as viewed in FIG. 1 by a spring 40a. The reset lever 39 has an arm 39b engageable with the lug 32a of the first lever 32 and an arm 39b engageable with the slanted extension edge 29d of the pawl lever 29. The reset lever 39 further has an arm 39a which is formed with a slot 39a'.

A latching lever 41 is pivotal about a pin 42 and has a pin 41b fixed thereto which extends through the slot 39a' of the reset lever 39. The latching lever 41 also carries a pin 41a with which the slanted edge 12d of the drive bar 12 is engageable. The latching lever 41 also has an arm 41c which is engageable with a shutter release connector pin 43 connected to the shutter to trip the same when moved downward as viewed in FIG. 3. A holding lever 44 is pivotal about a pin 45 and has an arm 44b which is formed with a step 44b' for holding the arm 41c of the latching lever 41 in a latching position as shown in phantom line in FIG. 3. The holding lever 44 also has an arm 44a formed with a lug 44a' at its end. The holding lever 44 is biased counterclockwise as viewed in FIG. 3 by a tension spring 44c.

Figure 2:
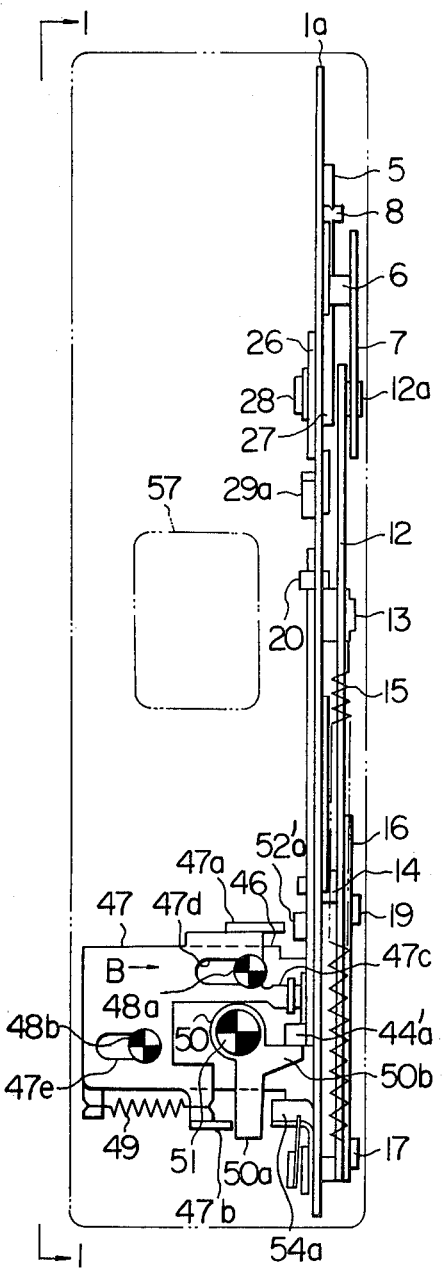
FIG. 2 is a side view of the mechanism taken on a line 2—2 of FIG. 1.

Referring now to FIG. 2, a mounting plate 46 is fixed to the mounting plate 1a at a right angle thereto and has pins 48a and 48b fixed thereto. A shutter release member 47 is formed with slots 47d and 47e through which the pins 48a and 48b respectively extend for guiding the shutter release member 47 for right and left movement as viewed in FIG. 2. A tension spring 49 urges the release member 47 leftward toward an initial position as viewed in FIG. 2. The shutter release member 47 is connected to a shutter release button (not shown) of the camera so that the shutter release member 47 is moved rightward as shown by an arrow B in FIG. 2 when the photographer presses the shutter release button. The shutter release member 47 has extensions 47a, 47b and 47c. The extension 47c is arranged to be positioned above the step 12e of the drive bar 12 only when the drive bar 12 is in the lowermost position as shown.

A coupling lever 50 is pivotal about a pin 51 fixed to the plate 46 and has a lower arm 50a engageable with the extension 47b of the shutter release member 47. The coupling lever 50 further has an upper arm 50b engageable with the lug 44a' of the holding lever 44.

Referring again to FIG. 3, a stop lever 52 is pivotal about a pin 53 and has an arm 52b formed with a slot 52b' through which the pin 37a' of the latch lever 37 extends. The stop lever 52 also has an arm 52a which is formed with a lug 52a' at its end. The lug 52a' is adapted to be moved into and out of alignment with the extension 47a of the shutter release member 47 as will be described in detail below.

As best viewed in FIG. 3, a stop arm 54 is pivotal about a pin 55 and is biased counterclockwise as viewed in FIG. 3 by a spring 56 so that a lug 54a formed at the end thereof is urged toward a position of alignment with the arm 50a of the coupling lever 50 as will be described in detail below. The stop arm 54 is further provided with a pin 54b which is engageable with the lower end of the drive bar 12 so that the pin 54b and therefore the arm 54 are moved to the position shown in the drawings when the drive bar 12 is in its lowermost position.

The operation of the mechanism will now be described with reference to the drawings.

INITIAL CONDITION

In the condition shown in the drawings, the shutter has been released but the film has not been advanced to the next frame. The drive bar 12 is biased to its lowermost position as shown by the spring 15, and the cocking bar 16 is urged upwards by the spring 18 so that the lug 16c abuts against the lower edge portion of the drive bar 12. Both the drive bar 12 and cocking bar 16 are in their initial positions. Release of the shutter causes the cocking pin 19 to move downwards into engagement with the top of the lug 16a of the cocking bar 16.

The pawl arm 20 is rotated to its most counterclockwise position as viewed in FIG. 1 by the spring 22 so that the pawl 20a engages with the serrated edge portion 12b of the drive bar 12, thereby allowing only upward movement of the drive bar 12. The pawl 11 engaging with the winding gear 5 allows only clockwise rotation of the winding gear 5.

The latch lever 37 is in a latching position in which the lug 29e of the pawl lever 29 is in engagement with the arm 37a so that the pawl lever 29 is held in a counterclockwise pawl latching position (FIG. 1) so that the pawl 29a is held out of engagement with the ratchet wheel 26. The reset lever 39 is released and rotated clockwise by the spring 40a so that the arm 39b rotates the first lever 32 by means of the lug 32a counterclockwise about the pin 33 so that the sensing arm 35a is moved away from the film 2a.

Referring to FIG. 3, the holding lever 44 and latching lever 41 are in the positions shown so that the shutter release connector pin 43 is in the lowermost or shutter release position as shown.

Referring to FIG. 2, the shutter release member 47 is urged to its leftmost or initial position by the spring 49. It is, however, prevented from moving rightward toward a shutter release position by the lug 52a' of the stop lever 52 which is positioned in front of the extension 47a of the shutter release member 47.

FILM LEADER WINDING

The film 2a is provided with a leader which has no perforations. It is therefore necessary to wind the leader onto the take-up spool 3 until the first frame of the film 2a is moved into a frame position in front of a frame aperture 57. A camera optical system which is not shown is arranged in a conventional manner to focus a light image of the scene being photographed through the frame aperture 57 onto the film 2a.

To wind the leader, the photographer rotates the film winding lever (not shown) so that the drive bar 12 is moved upward as shown by an arrow A in the drawings. Since the cocking bar 16 is biased into engagement with the drive bar 12 by means of the spring 18 and lug 16c, the drive bar 12 and cocking bar 16 move upward as a unit. The lug 16a of the cocking bar 16 moves the shutter cocking pin 19 upwards to cock the shutter. When the cocking bar 16 is moved upward to a shutter cocking position at which the bottoms of the slots 16b and 16d engage with the pins 17a and 17b respectively, the cocking bar 16 is prevented from further upward movement and the drive bar 12 moves further upward against the force of the spring 18.

The slanted edge 12d of the drive bar 12 engages with the pin 41a of the latching lever 41 thereby rotating the latching lever 41 clockwise about the pin 42 as viewed in FIG. 1 or counterclockwise as viewed in FIG. 3. Referring to FIG. 3, counterclockwise rotation of the latching lever 41 continues until the arm 41c of the latching lever 41 is positioned above the step 44b' of the holding lever 44. The latching lever 41 is thereby held in a reset lever latching position by the holding lever 44.

Referring to FIG. 1, clockwise rotation of the latching lever 41 causes counterclockwise rotation of the reset lever 39 against the force of the spring 40a by means of the pin 41b engaged in the slot 39a'. The arm 39c of the reset lever 39 disengages from the edge 29d of the pawl lever 29. Referring to FIG. 3, clockwise rotation of the arm 39b allows the spring 34 to rotate the first lever 32 counterclockwise and thereby move the arm 35a of the sensing lever 35 into a sensing position in engagement with the film 2a, since the lug 32a is allowed to move leftward by the arm 39b.

Upward movement of the drive bar 12 in FIG. 1 causes the rocker arm 7 to rotate clockwise in FIG. 1 by means of the pin 12a engaged in the slot 7a. Since the pawl 8a of the pawl arm 8 is engaged with the teeth of the winding gear 5, the winding gear 5 rotates clockwise along with the rocker arm 7. Clockwise rotation of the winding gear 5 causes the take-up spool gear 4, shaft 4a and take-up spool 3 to rotate counterclockwise thereby winding the film leader onto the take-up spool 3 as indicated by an arrow C. The film 2a moves upwards past the frame aperture 57 as viewed in the drawings. The upward movement of the drive bar 12 is stopped when the bottoms of the slots 12f and 12g engage with the pins 13 and 14 respectively. Further movement of the drive bar 12 causes the pin 12c to engage with the pawl arm 20 thereby rotating the same clockwise as viewed in FIG. 1 so that the pawl 20a moves out of engagement with the serrated portion 12b of the drive bar 12. Referring now to FIG. 3, upward movement of the drive bar 12 from the initial position causes the pin 12c to move out of engagement with the arm 23a of the latching lever 23 so that the latching lever 23 is rotated clockwise (FIG. 3) by the spring 25 into engagement with a lug 20b formed at the end of the pawl arm 20. As a result of the rotation of the pawl arm 20 and the latching lever 23, the top of the arm 23b will move under the lug 20b of the pawl arm 20 so that the pawl arm 20 will be held out of engagement with the serrated portion 12b by engagement of the lug 20b with the upper surface of the arm 23b. The photographer then releases the film winding lever and the spring 15 returns the drive bar 12 and cocking bar 16 to their initial positions. This operation is repeated a number of times until the first frame of the film 2a is positioned in the framing position in front of the frame aperture 57. The shutter will remain cocked since the cocking pin 19 has been once moved to the upward position. Similarly, the arm 41c will remain engaged with the step 44b' of the holding lever 44 and the reset lever 39 will remain in the position previously described. When the drive bar 12 reaches its initial position, the pin 12c will engage with the arm 23a thereby rotating the latching lever 23 counterclockwise (FIG. 3) to release the pawl arm 20, which returns to the position shown in the drawings to engage with the serrated portion 12b.

WINDING STOPPING (FIRST FRAME)

The leader winding operation is continued until the first frammme of the film 2a is positioned in front of the frame aperture 57. At this point, the end of the arm 35a of the sensing lever 35 drops into the hole in the film 2a indicating the first frame. As viewed in FIG. 1, due to slight additional movement of the film 2a, the sensing lever 35 is rotated counterclockwise, thereby rotating the latch lever 37 clockwise. The end of the arm 37a of the latch lever 35 moves clockwise away from the lug 29e of the pawl lever 29 so that the pawl lever 29 is released and is rotated clockwise by the spring 40a. The pawl 29a engages with the ratchet wheel 26 thereby stopping movement of the ratchet wheel 26, gear 27, winding gear 5, take-up spool gear 4, take-up spool shaft 4a, take-up spool 3 and drive bar 12. The extension 29b of the pawl lever 29 engages with the pawl 20a of the pawl arm 20 and rotates the same clockwise in FIG. 1 so as to be held away from the serrated portion 12b. The photographer then releeaases the winding lever so that the drive bar 12 is returned to the initial position by the spring 15.

SHUTTER RELEASING

To release the shutter and expose the film 2a, the photographer pushes the shutter release button which moves the shutter release member 47 rightward as viewed in FIG. 2. The shutter release member 47 is free to move rightward since the extension 47c is above the step 12e of the drive bar 12 and the stop arm 54 is rotated out from in front of the arm 50a of the coupling lever 50. As best seen in FIG. 2, the movement of the latch lever 37 causes the stop lever 52 to rotate clockwise so that the lug 52a' thereof is moved out from in front of the extension 47a. Rightward movement of the shutter release member 47 in FIG. 2 causes the coupling lever 50 to rotate counterclockwise, thereby moving the lug 44a' of the holding lever 44 upwards.

Referring now to FIG. 3, upward movement of the lug 44a' causes the holding lever 44 to rotate clockwise, thereby releasing the arm 41c of the latching lever 41 from the step 44b' of the holding lever 44. The latching lever 41 is rotated clockwise in FIG. 3 by the force of the spring 40a transmitted thereto by the reset lever 39, and moves the shutter release connector pin 43 downwards thereby releasing the shutter. The cocking pin 19 moves downward to engage with the top of the lug 16a of the cocking lever 16 by the action of the shutter.

Referring now to FIG. 1, the reset lever 39 is released for clockwise rotation by the spring 40a. The arm 39c engages with the edge 29d of the arm 29f of the pawl lever 29 causing the pawl lever 29 to rotate counterclockwise against the force of the spring 31. The pawl 29a is disengaged from the ratchet wheel 26 thereby releasing the winding gear 5 and associated components so that the film 2a may again be wound. Clockwise rotation of the arm 39b of the reset lever 39 causes the first lever 32 to rotate counterclockwise so that the end of the arm 35a of the sensing lever 35 is retracted from the hole in the film 2a and the sensing lever 35 is moved out of engagement with the film 2a. Counterclockwise rotation of the arm 29f of the pawl lever 29 causes the lug 29e of the pawl lever 29 to engage with the arm 37a of the latch lever 37 to be latched thereby. Counterclockwise rotation of the arm 29c and thereby the extension 29b of the pawl lever 29 allows the pawl arm 20 to be rotated counterclockwise by the spring 22 so that the pawl 20a engages with the serrated portion 12b of the drive bar 12. The mechanism is thereby restored to its initial condition described above.

FILM ADVANCE (TO NEXT FRAME)

The photographer rotates the film winding lever so that the drive bar 12 is moved upwards. Since the cocking bar 16 is biased into engagement with the drive bar 12 by means of the spring 18 and lug 16c, the drive bar 12 and cocking bar 16 move upward as a unit. The lug 16a of the cocking bar 16 moves the shutter cocking pin 19 upwards to cock the shutter. When the cocking bar 16 is moved upward to the shutter cocking position at which the bottoms of the slots 16b and 16d engage with the pins 17a and 17b respectively, the cocking bar 16 is prevented from further upward movement and the drive bar 12 moves further against the force of the spring 18.

The slanted edge 12d of the drive bar 12 engages with the pin 41a of the latching lever 41 thereby rotating the latching lever 41 clockwise about the pin 42 as viewed in FIG. 1 or counterclockwise as viewed in FIG. 3. Referring to FIG. 3, counterclockwise rotation of the latching lever 41 continues until the arm 41c of the latching lever 41 is positioned above the step 44b' of the holding lever 44. The latching lever 41 is thereby held in the reset lever latching position by the holding lever 44.

Referring to FIG. 1, clockwise rotation of the latching lever 41 causes counterclockwise rotation of the reset lever 39 against the force of the spring 40a by means of the pin 41b engaged in the slot 39a'. The arm 39c of the reset lever 39 disengages from the edge 29d of the pawl lever 29. Referring to FIG. 3, clockwise rotation of the arm 39b allows the spring 34 to rotate the first lever 32 counterclockwise and thereby move arm 35a of the sensing lever 35 into the sensing position in engagement with the film 2a, since the lug 32a is allowed to move leftward by the arm 39b.

Upward movement of the drive bar 12 in FIG. 1 causes the rocker arm 7 to rotate clockwise in FIG. 1 by means of the pin 12a engaged in the slot 7a. Since the pawl 8a of the pawl arm 8 is engaged with the teeth of the winding gear 5, the winding gear 5 rotates clockwise along with the rocker arm 7. Clockwise rotation of the winding gear 5 causes the take-up spool gear 4, shaft 4a and take-up spool 3 to rotate counterclockwise thereby winding the film onto the take-up spool 3. When the drive bar 12 reaches its initial position, the pin 12c will engage with the arm 23a thereby rotating the latching lever 23 counterclockwise (FIG. 3) to release the pawl arm 20, which returns to the position shown in the drawings to engage with the serrated portion 12b.

As the next frame of the film 2a reaches the frame position in front of the frame aperture 57, the end of the arm 35a of the sensing lever 35 drops into the hole in the film 2a indicating the next frame. As viewed in FIG. 1, due to slight additional movement of the film 2a, the sensing lever 35 is rotated counterclockwise, thereby rotating the latch lever 37 clockwise. The end of the arm 37a of the latch lever 35 moves clockwise away from the lug 29e of the pawl lever 29 so that the pawl lever 29 is released and is rotated clockwise by the spring 40a. The pawl 29a engages with the ratchet wheel 26 thereby stopping movement of the ratchet wheel 26, gear 27, winding gear 5, take-up spool gear 4, take-up spool shaft 4a, take-up spool 3 and drive bar 12. The extension 29b of the pawl lever 29 engages with the pawl 20a of the pawl arm 20 and rotates the same clockwise in FIG. 1 so as to engage with and be held away from the serrated portion 12b. The photographer then releases the winding lever so that the drive bar 12 is returned to the initial position by the spring 15. The shutter releasing operation for the next frame of the film 2a is the same as described above for the first frame.

From the foregoing description it will be understood that the various objects of the invention are fully accomplished by the mechanism shown and described. The film 2a is advanced and the shutter is cocked by a single reciprocating movement of the drive bar 12, which represents a highly desirable advance over prior art winding mechanisms for 110 cartridge type film which require two reciprocations of a film winding member. Furthermore, the shutter is prevented from being released unless the film 2a has been advanced and the drive bar 12 has been returned to its initial position. Specifically, the combination of the extension 47c of the shutter release member and the step 12e of the drive bar 12 prevent the shutter release member 47 from being moved from its initial position unless the drive bar 12 is in its initial position. The stop arm 54 similarly prevents the coupling lever 50 from being moved unless the drive bar 12 is in its initial position. The stop lever 52 prevents the shutter release member 47 from being moved from the initial position unless the film winding operation has been stopped by engagement of the pawl 29a with the ratchet wheel 26 by blocking the lug 47a of the shutter release member 47. The mechanism is therefor completely effective in preventing the shutter from being released while the film is being moved or the film has not been advanced to eliminate waste of film and also prevent the various component parts of the mechanism from being broken or jammed.

Although only one embodiment of the invention has been shown and described, it will be understood that many modifications and further embodiments of the invention within the scope thereof will be possible to those skilled in the art after receiving the teachings of the present disclosure.

What is claimed is:

1. A camera film winding and shutter actuating mechanism, comprising:
   a film take-up spool drive member;
   a shutter cocking member movable with the spool drive member;
   cocking member stop means operatively arranged to prevent movement of the cocking member beyond a shutter cocking position;
   cocking member biasing means releasably connecting the cocking member to the spool drive member so that the cocking member is movable in a film winding direction with the spool drive member up to the shutter cocking position and the spool drive member is movable further against the force of the cocking member biasing means;
   film frame position sensing means operative to sense a film frame condition and move from a sensing position to a film frame position in response thereto; and
   spool drive member stop means actuated by the position sensing means and operative to stop movement of the spool drive member when the position sensing means senses the film frame condition and moves to the film frame position.

2. The mechanism of claim 1, further comprising a shutter release member.

3. The mechanism of claim 2, in which the spool drive member is movable from an initial position in the film winding direction, the mechanism further comprising shutter release member stop means operative to prevent movement of the shutter release member from an initial position toward a shutter release position except when the spool drive member is in its initial position.

4. The mechanism of claim 3, in which the shutter release member stop means further comprises means to prevent movement of the shutter release member from its initial position toward the shutter release position when the position sensing means is in its sensing position.

5. The mechanism of claim 1, further comprising a film take-up spool shaft and spool drive linkage means connected between the spool drive member and the film take-up spool shaft.

6. The mechanism of claim 5, in which the spool drive linkage means comprises:
   a ratchet wheel rotatably drivably connected to the film take-up spool shaft; and
   pawl means drivably connecting the spool drive member to the ratchet wheel in the film winding direction and being releasable in an opposite direction.

7. The mechanism of claim 6, in which the spool drive member is formed with a serrated portion, the mechanism further comprising a unidirectional pawl biased toward engagement with the serrated portion to allow movement of the spool drive member only in the film winding direction and latching means to hold the unidirectional pawl in a latching position out of engagement with the serrated portion, the spool drive member being formed with an engaging portion engageable with the unidirectional pawl and the latching means to move the unidirectional pawl to the latching position when the spool drive member is moved in the film winding direction to a predetermined position and trip the latching means to release the unidirectional pawl when the spool drive member is moved in the opposite direction to an initial position.

8. The mechanism of claim 7, in which the spool drive member stop means is operative to move the unidirectional pawl to the latching position when actuated by the position sensing means.

9. The mechanism of claim 5, in which the spool drive member stop means comprises a ratchet wheel rotatably drivably connected to the film take-up spool shaft and a pawl engageable with the ratchet wheel to prevent movement thereof and thereby stop movement of the spool drive member and the film take-up spool shaft.

10. The mechanism of claim 9, in which the spool drive member stop means further comprises a latch member to hold the pawl out of engagement with the ratchet wheel, the latch member being movable by the position sensing means to release the pawl to engage with the ratchet wheel.

11. The mechanism of claim 10, further comprising reset means to move the pawl to a pawl latching position where it is held out of engagement with the ratchet wheel by the latch member.

12. The mechanism of claim 11, in which the reset means comprises a reset lever biased to engage with the pawl and move the pawl to the pawl latching position.

13. The mechanism of claim 12, further comprising a shutter release member, the reset means further comprising latching means connected to the reset lever, the latching means being movable by the spool drive member to a reset lever latching position in which the reset lever is disengaged from the pawl, the shutter release member being arranged to trip the latching means so that the latching means is moved from the reset lever latching position and the reset lever is released to move the pawl to the pawl latching position.

14. The mechanism of claim 13, in which the film frame position sensing means is biased toward a film engageable position, the reset lever being further arranged to hold the position sensing means away from the film engageable position except when the reset lever is held out of engagement with the pawl by the latching means.

15. The mechanism of claim 14, in which the position sensing means comprises a first lever engageable with the reset lever and a film perforation sensing lever rotatably carried by the first lever and being engageable with the latch member.

16. The mechanism of claim 13, further comprising a shutter release connector connected to be moved to a shutter release position by the latching means when the latching means is tripped by the shutter release member.

17. The mechanism of claim 10, further comprising stop means connected to the latch member to prevent movement of the shutter release member when the latch member holds the pawl out of engagement with the ratchet wheel.

* * * * *